Patented July 15, 1930

1,770,476

UNITED STATES PATENT OFFICE

FREDERICK EARL BAILEY, OF ELWOOD, NEAR MELBOURNE, VICTORIA, AUSTRALIA

PROCESS FOR RECOVERY OF GREASE OR FAT

No Drawing. Application filed August 22, 1923, Serial No. 658,769, and in Australia September 19, 1922.

This invention relates to a process for the recovery of wool grease from wool scour liquors or mud and the refining of wool grease and fats such as mutton and beef tallow to provide an odorless grease or fat of great commercial utility.

Anhydrous adeps lanæ is preferably produced directly from wool scouring liquor or mud and the process employed in this invention is cheap, simple, and effective.

Liquors from boiling down processes may be treated in a similar way to recover the fats contained therein.

The process consists of three main steps, which steps will be described in order in the following three paragraphs.

First, the wool scour liquors or the like are mixed with a suitable quantity of water and the whole is then forcibly circulated in an endless cycle through a vat or tank. This circulation causes frothing of the solution. The activity of frothing can be, and preferably is, increased by mechanical agitation. The wool greases or fats, being light, are thus suspended in the froth at the surface of the solution. It is also preferable to increase the agitation and frothing by injecting a stream of air into the circulating solution and into the bottom of the vat. This may be done by a frothing device such as those disclosed in the patents to Hockley, 466,753; Kirby, 809,959; or Hyde, 1,022,085.

The froth, which consists of greases and fats, and also dirt and foreign matter, suspended in a quantity of foamy liquor, is then removed and treated in a separate tank to deodorize and clarify the fat and separated to recover the wool fat in purified form. A suitable substance or agent for carrying out this treatment or reaction consists of a mixture of nitrogen which is usually considered as proteid in its nature and starch in the proportions of one part of nitrogen calculated as proteid to ten parts of starch, sodium or potassium hydrate, and water. It has been found that potatoes, minced into small pieces, will provide the desired or requisite form of proteids and starch but of course these latter substances may be obtained from other materials and used with satisfactory results. The proportions used in the mixture will depend upon the nature of the froth and the quantity of mixture will depend upon the quantity of froth to be treated. For example, in one formula, one ton of minced potatoes, two cwt. of sodium or potassium hydrate, and 240 gallons of water are mixed to provide a suitable agent. The combination of caustic soda and potato may then be diluted to any required strength which varies in wide limits depending on the nature of the material treated, but for general purposes one part of the compound to five parts of water has been found to be satisfactory. A heat of approximately 212° F. is then applied throughout a period of about two hours, thus causing a chemical and physical reaction to take place. During this reaction, the wool fat is clarified and deodorized and the dirt and foreign matter is separated out and drops to the bottom. The greases and fats rise to the surface, and contain slight amounts of the liquor or solution.

These greases and fats are removed and subjected to heat. All moisture is boiled from them to leave a pure anhydrous wool grease or fat ready for commercial use. The liquors remaining in the first and second vats may be again circulated and agitated to produce a froth and thus secure any greases and fats which escaped during the first treatment. These may then, in the same manner as outlined above, be further treated to deodorize, clarify, and separate them from the liquors and impurities.

Having now described my invention with particularity, what I claim is:—

1. A process for the recovery of the fats from wool scour solutions and muds which comprises subjecting the wool scour solution to a continuous circulation and agitation to cause the solution to froth, removing the froth in which is contained the fat from the wool scour solution and in which is contained a quantity of dirt and foreign material, treating the removed froth with a mixture of water, alkali hydrate, and farinaceous vegetable matter having a proteid and starch content, and heating the mixture, the reaction causing the fat to be deodorized, clarified, and separating the fat from the dirt and foreign material, thus leaving a liquor consisting of a portion of said mixture together with the dirt and foreign material, and evaporating the moisture from the separated fat.

2. A process as defined in claim 1 wherein a stream of air is injected into the agitated solution to aid frothing.

3. The process defined in claim 1 wherein the step of treating the removed froth comprises adding to the froth a mixture in the approximate proportions of 240 gallons of water, 2 cwt. of an alkali hydrate, and a quantity of farinaceous vegetable product having substantially the same proteid and starch content as one ton of potatoes, and heating the mixture for approximately two hours at a temperature of about 212° F.

4. The process defined in claim 1 wherein the step of treating the removed froth comprises adding to the froth a mixture in the approximate proportions of one ton of minced potatoes to 200 lbs. of alkali hydrate and 240 gallons of water, and heating the mixture for substantially two hours at a temperature of about 212° F.

Signed at Melbourne, Victoria, Australia, this 23rd day of July, 1923.

FREDERICK EARL BAILEY.